United States Patent
Urban et al.

(10) Patent No.: US 6,983,038 B2
(45) Date of Patent: Jan. 3, 2006

(54) MAINTENANCE TERMINATION UNIT

(75) Inventors: Blake R. Urban, Lenior, NC (US);
Isaac D. M White, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 349 days.

(21) Appl. No.: 10/282,827

(22) Filed: Oct. 29, 2002

(65) Prior Publication Data

US 2004/0109549 A1 Jun. 10, 2004

(51) Int. Cl.
*H04M 1/24* (2006.01)

(52) U.S. Cl. ............................. 379/29.11; 379/27.01

(58) Field of Classification Search ............ 379/27.01, 379/29.01, 27.02, 27.03, 27.04, 29.05, 29.11, 379/30, 31, 26.01, 24, 22.03, 22.02; 324/205, 324/214, 228, 259, 260, 512, 513, 600
See application file for complete search history.

(56) References Cited

U.S. PATENT DOCUMENTS

| | | | | |
|---|---|---|---|---|
| 4,369,341 A | * | 1/1983 | Ahuja | 379/27.01 |
| 4,415,779 A | * | 11/1983 | Bowman | 379/27.01 |
| 4,438,299 A | * | 3/1984 | Tomim | 379/27.06 |
| 4,489,221 A | * | 12/1984 | Walker et al. | 379/315 |
| 4,529,847 A | | 7/1985 | DeBalko | |
| 4,543,524 A | * | 9/1985 | Bulley | 324/520 |
| 4,756,017 A | | 7/1988 | Bush | |
| 5,004,433 A | | 4/1991 | Daoud | |
| 5,207,583 A | | 5/1993 | DeBalko | |
| 5,353,327 A | * | 10/1994 | Adari et al. | 379/22 |
| 5,357,556 A | | 10/1994 | Dresser | |
| 5,652,575 A | | 7/1997 | Pryor | |
| 6,061,428 A | | 5/2000 | Andrews | |
| 6,169,784 B1 | * | 1/2001 | Smith | 379/27.01 |
| 6,252,941 B1 | | 6/2001 | Daoud | |
| 6,614,881 B1 | * | 9/2003 | Atkins | 379/22 |

* cited by examiner

*Primary Examiner*—Rexford Barnie
(74) *Attorney, Agent, or Firm*—Walters & Zimmerman; Geoff Sutcliffe; Todd Mitchem

(57) ABSTRACT

Methods and apparatuses are disclosed for locating trouble in a telecommunications network. One method communicates signals from a central office along a local loop. The local loop comprises a ring wire and a tip wire. Voltage polarity between the ring wire and the tip wire is reversed, causing a customer's wiring to be isolated from the local loop. A test of the local loop may then be remotely performed to determine whether trouble exists in the local loop.

14 Claims, 6 Drawing Sheets

MAINTENANCE TERMINATION UNIT

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to telecommunications and, more particularly, to maintenance termination units for locating trouble in a telecommunications network.

2. Description of the Related Art

Maintenance termination units help locate trouble in a telecommunications network. When trouble is reported, that trouble may lie within the customer's premises and/or within the local loop serving the customer. Maintenance termination units have been used to help determine whether the trouble lies within the local loop or within the customer's premises.

U.S. Pat. No. 4,529,847 to DeBalko (issued Jul. 16, 1985) shows a maintenance termination unit. This maintenance termination unit comprises a pair of "normally open" voltage switches connected between the ring and tip of the local loop (see Column 3, lines 30–33). When this maintenance termination unit is installed at the customer's premises, the maintenance termination unit produces a distinctive, periodic DC signal (see Column 4, lines 37–50). When a fault lies within the customer's premises, this distinctive, periodic DC signal is produced regardless of polarity between the ring and the tip (see Column 4, line 63–Column 5, line 1). If trouble lies within the telecommunications network, then the maintenance termination unit produces either a steady signal (a "hard" fault) or a periodic signal (a "light" fault) (see Column 5, lines 1–7). Because this maintenance termination unit utilizes voltage switches, these switches unfortunately cycle between an open position and a closed position when indicating the presence of a fault (see Column 4, lines 46–48). This periodic signal is often confused by test technicians and leads to an inaccurate diagnosis. This constant cycling, between an open position and a closed position, also leaves little time to conduct a test of the local loop.

Other maintenance termination units have disadvantages. Many of these prior art maintenance termination units utilize custom, integrated circuitry. These integrated circuits are expensive and time-consuming to design and to fabricate. The expense of designing and fabricating these circuits, in fact, is often cost-prohibitive. Even when an integrated circuit is used, the harsh, ambient environment leads to many field failures. When the integrated circuit fails, the entire maintenance termination unit is then wastefully discarded.

There is, accordingly, a need for an improved maintenance termination unit that is easier to use, less expensive to design and to manufacture, tolerant of ambient conditions, and cheaper to repair or replace in the field.

BRIEF SUMMARY OF THE INVENTION

The aforementioned problems, and other problems, are reduced by an improved maintenance termination unit. This maintenance termination unit quickly, simply, and inexpensively isolates a customer's premises from a local loop. This invention is inexpensively designed and manufactured, and this invention is easier to repair and to replace. This invention tolerates extreme cold and hot temperatures, and this maintenance termination unit is largely unaffected by higher humidity climates. This maintenance termination unit utilizes a magnet to isolate a customer's premises from a local loop. The magnet responds to a reversal in polarity on a customer's telephone line. When polarity is reversed, the magnet acts to isolate the customer's premises. A test of the telephone line may then be performed.

One embodiment of this invention describes a method for determining whether trouble is located in a local loop. This method communicates signals from a central office along the local loop. The local loop comprises a ring wire and a tip wire. Voltage polarity between the ring wire and the tip wire is reversed, causing a customer's wiring to be isolated from the local loop. A test of the local loop may then be remotely performed to determine whether trouble exists in the local loop.

Another embodiment of this invention also describes a method for determining whether trouble is located in a local loop. This embodiment communicates signals from a central office along a local loop, and the local loop comprises a ring wire and a tip wire. The polarity between the ring wire and the tip wire is reversed. In response to this reversed polarity, a magnet is utilized to isolate a customer's wiring from the local loop. The magnet may be any type of magnet, such as a permanent magnetic material, a diamagnetic material, a paramagnetic material, and a ferromagnetic material. When the customer's wiring is isolated from the local loop, a test of the local loop is remotely performed. The reversed polarity causes the customer's wiring to be isolated from the local loop, and the local loop may be remotely tested to determine if trouble is located in a local loop.

Yet another embodiment describes a maintenance termination unit for a telecommunications network. The maintenance termination unit comprises terminals for connecting the maintenance termination unit to a ring wire and to a tip wire of a local loop. The maintenance termination unit also comprises a magnet responding to a change in polarity between the ring wire and the tip wire. When the polarity is changed, the maintenance termination unit isolates a customer's wiring from the local loop, thus allowing a remote test to determine whether trouble exists in the local loop.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
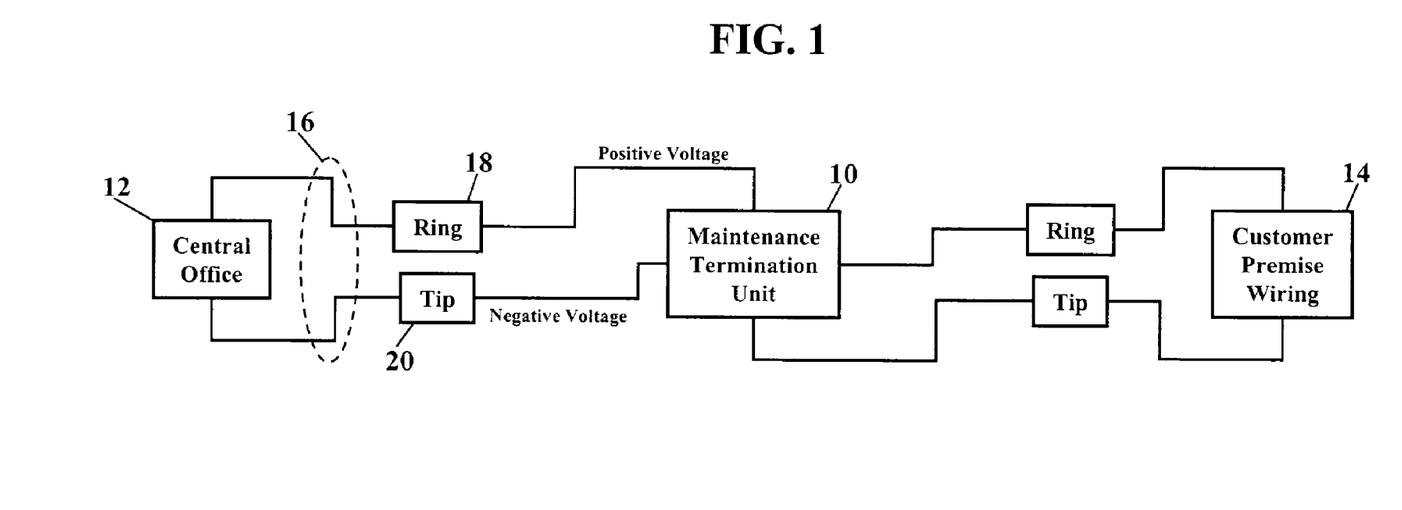
FIGS. 1 and 2 are schematics illustrating one embodiment of this invention.
Figure 2:
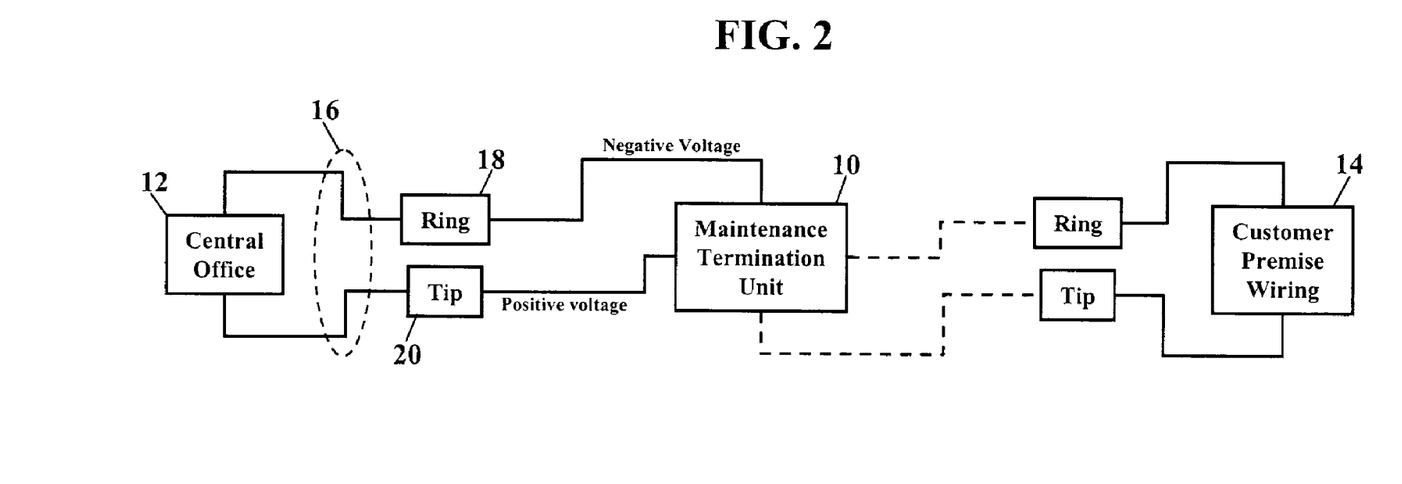

FIGS. 1 and 2 are schematics illustrating one embodiment of this invention. A maintenance termination unit 10 is installed between a central office (CO) 12 and a customer's premise wiring 14. Signals are communicated from the central office 12, along a local loop 16, and to the maintenance termination unit 10. As FIG. 1 shows, the local loop 16 comprises a ring wire 18 and a tip wire 20. The ring wire 18 normally has a positive voltage compared to the tip wire 20. When the ring wire 18 has a positive voltage compared to the tip wire 20, the maintenance termination unit 10 allows signals to pass to the customer's premise wiring 14. Signals, then, are communicated from the central office 12, along the ring local loop 16, through the maintenance termination unit 10, and to the customer's premise wiring 14. The customer's premise wiring then routes the signals to a communication device (not shown) connected to the customer's premise wiring 14.

FIG. 2 shows the maintenance termination unit 10 can isolate the customer's premise wiring 14 from the local loop 16. When a customer reports trouble with their communications service, the trouble may be within the local loop 16 or within the customer's premise wiring 14. The maintenance termination unit 10 allows a telecommunication service provider to isolate the customer's premise wiring 14 from the local loop 16. When the maintenance termination unit 10 isolates the customer's premise wiring 14 from the local loop 16, the telecommunication service provider may then remotely perform a test of the local loop 16. If no trouble or fault is detected, then the trouble lies within the customer's premise wiring 14.

A reversed polarity condition activates the maintenance termination unit 10. The ring wire 18, as mentioned above, normally has a positive voltage compared to the tip wire 20. When, however, polarity is reversed, this reversed polarity condition causes the maintenance termination unit 10 to isolate the customer's premise wiring 14 from the local loop 16. While the maintenance termination unit 10 maintains the customer's premise wiring 14 isolated from the local loop 16, the telecommunication service provider remotely performs a test of the local loop 16. The telecommunication service provider may perform any test, such as a mechanized loop test (MLT), to help determine whether trouble lies within the local loop 16.

Polarity may again be switched before performing the test. A reversed polarity condition, as mentioned above, activates the maintenance termination unit 10. Once the maintenance termination unit 10 isolates the customer's premise wiring 14 from the local loop 16, polarity may again be switched. The ring wire 18 would return to a normally positive voltage compared to the tip wire 20. Even though the ring wire 18 now has a positive voltage, the maintenance termination unit 10 is designed to maintain an isolation between the customer's premise wiring 14 and the local loop 16. This isolation is maintained for a predefined length of time, from milliseconds to hours. Preferably, however, this isolation is only maintained for a "test window." This "test window" is a predefined, finite amount of time, during which time the remote test is performed. The maintenance termination unit 10, for example, isolates the customer's premise wiring 14 for a "test window" of not exceeding about a minute, during which time the test is performed. When the test window expires, the maintenance termination unit 10 restores a connection between the local loop 16 and the customer's premise wiring 14.

Figure 3:
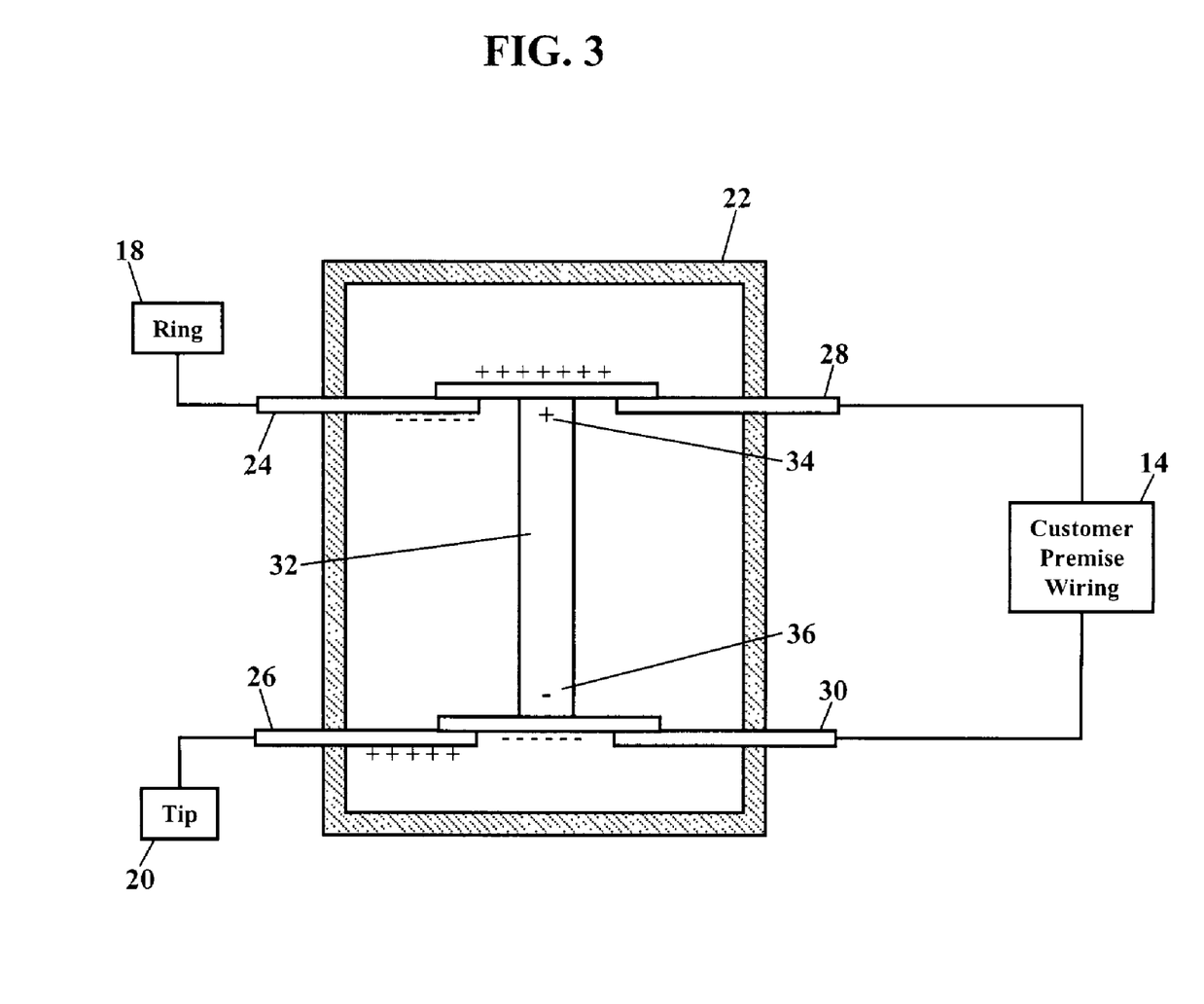
FIGS. 3–5 are schematics showing another embodiment of this invention.
Figure 4:
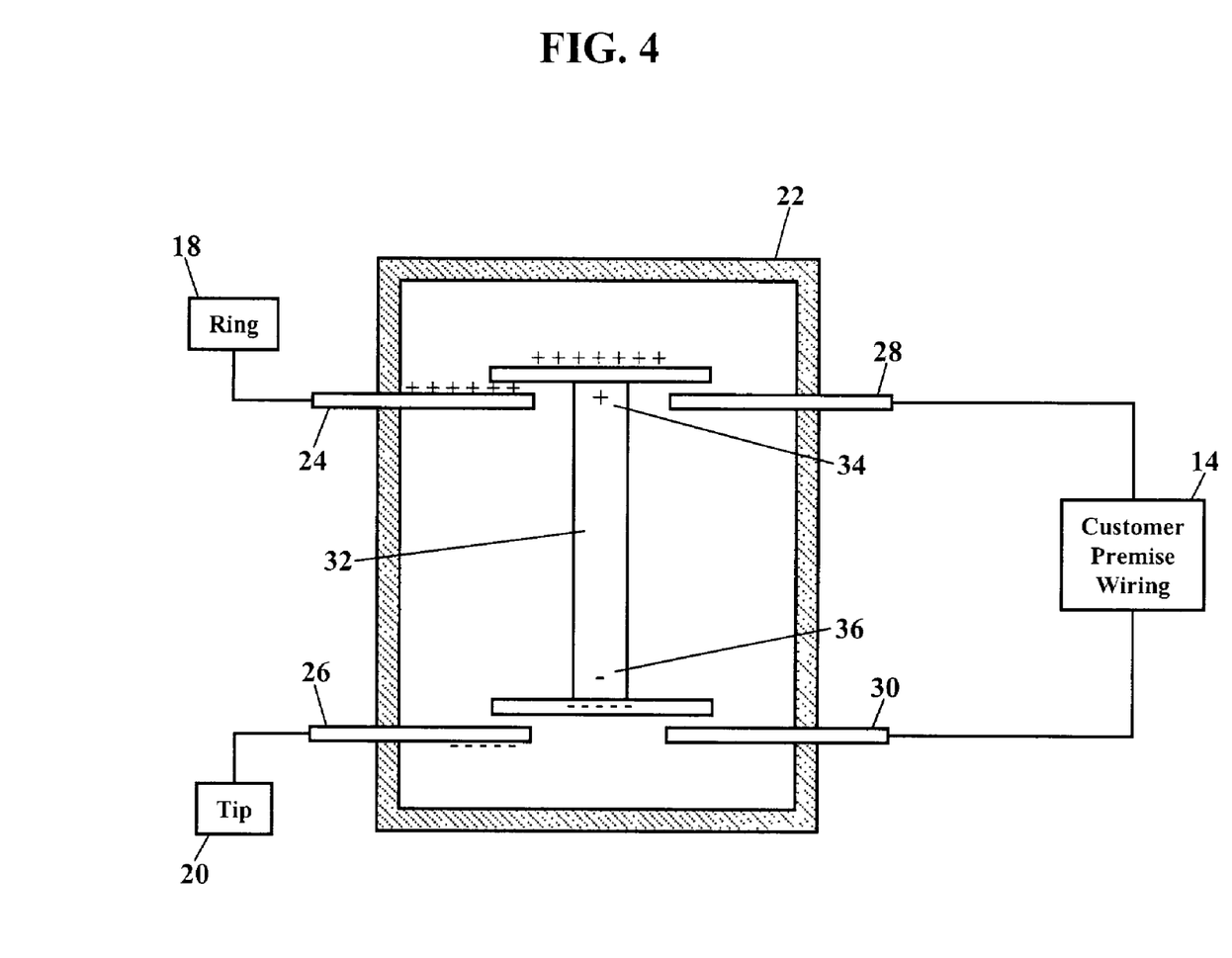
Figure 5:
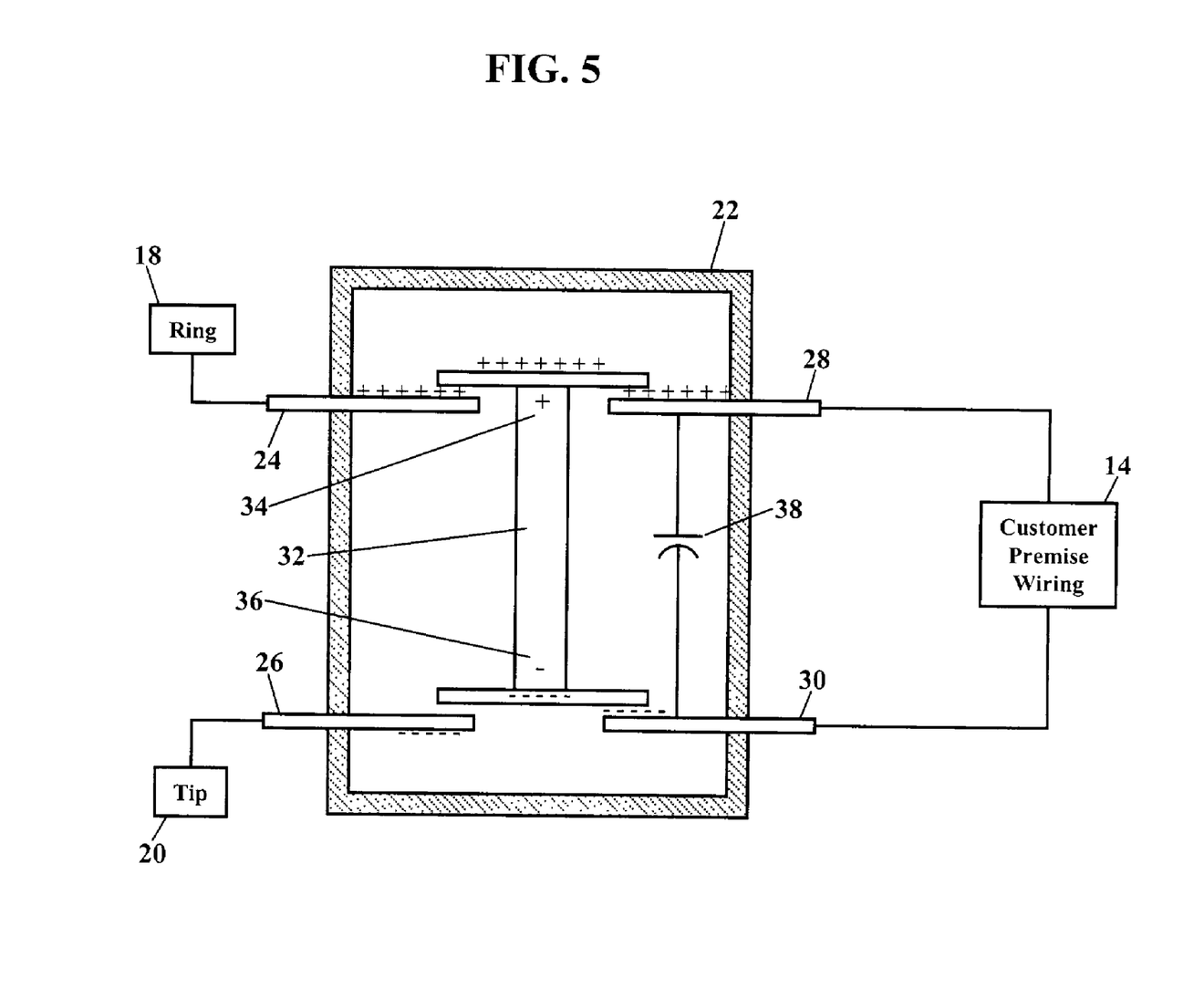

FIGS. 3–5 are schematics showing a second embodiment of this invention. FIGS. 3 and 4 are sectional views of a maintenance termination unit 22 for isolating a customer's premise wiring from the local loop (shown, respectively, as reference numerals 14 and 16 in FIGS. 1 and 2). FIGS. 3 and 4 are also enlarged views to emphasize the functional characteristics of this maintenance termination unit 22. The maintenance termination unit 22 comprises a first terminal 24 and a second terminal 26 for connecting to the local loop. The first terminal 24, for example, connects to the ring wire 18, and the second terminal 26 connects to the tip wire 20 of the local loop. The maintenance termination unit 22 also comprises a third terminal 28 and a fourth terminal 30 for connecting to the customer's premise wiring 14.

The maintenance termination unit 22 also comprises a magnet 32. The magnet 32 responds to a change in polarity between the ring wire 18 and the tip wire 20. The magnet 32 is traditionally understood to have "north pole" at one end 34. The magnet is also understood to have a "south pole" at another end 36. Positive charges gather at the north pole 34, while negative charges gather at the south pole 36. When the polarity of the ring wire 18 causes negative charges to gather at the first terminal 24, these negative charges attract the positive charges gathered at the north pole 34 of the magnet 32. The corresponding polarity of the tip wire 20 causes positive charges to gather at the second terminal 26, and these positive charges attract the negative charges gathered at the south pole 36. This attractive force causes the magnet 32 to move.

The magnet 32, however, may also be repelled. When the polarity of the ring wire 18 causes positive charges to gather at the first terminal 24, these positive charges repel the positive charges gathered at the north pole 34 of the magnet 32. The corresponding polarity of the tip wire 20 causes negative charges to gather at the second terminal 26, and these negative charges attract the positive charges gathered at the south pole 36. This repelling force also causes the magnet 32 to move.

The polarity of the ring wire 18 and the tip wire 20 may then be used to move the magnet 32. This movement of the magnet 32 is used in this second embodiment to isolate the customer's premise wiring 14 from the local loop 12. This movement of the magnet 32 is also used to connect the customer's premise wiring 14 to the local loop 12. FIG. 3, for example, shows the polarity of the ring wire 18 causing negative charges to gather at the first terminal 24. These negative charges attract the positive charges gathered at the north pole 34 of the magnet 32. The corresponding polarity of the tip wire 20 causes positive charges to gather at the second terminal 26, and these positive charges attract the negative charges gathered at the south pole 36. FIG. 3, then, shows that this attractive force causes the magnet 32 to move and connect the first terminal 24, and thus the ring wire 18, to the third terminal 28. This attractive force, likewise, causes the magnet 32 to move and connect the second terminal 26, and thus the tip wire 20, to the fourth terminal 30. The polarity of the ring wire 18 and the tip wire 20, therefore, causes the maintenance termination unit 22 to connect the local loop to the customer's premise wiring 14.

Polarity is also used to isolate the customer's premise wiring 14. FIG. 4 shows the polarity of the ring wire 18 causing positive charges to gather at the first terminal 24. These positive charges repel the positive charges gathered at the north pole 34 of the magnet 32. The corresponding polarity of the tip wire 20 causes negative charges to gather at the second terminal 26, and these negative charges repel the negative charges gathered at the south pole 36. FIG. 4, then, shows that this repelling force causes the magnet 32 to move and disconnect the first terminal 24, and thus the ring wire 18, from the third terminal 28. This repelling force, likewise, causes the magnet 32 to move and disconnect the second terminal 26, and thus the tip wire 20, from the fourth terminal 30. The polarity of the ring wire 18 and the tip wire 20, therefore, causes the maintenance termination unit 22 to isolate the local loop to the customer's premise wiring 14.

FIG. 5 is a schematic showing a means of storing a charge. This means of storing a charge helps maintain an isolation between the customer's premise wiring 14 and the local loop (shown as reference numeral 16 in FIGS. 1 and 2). A reversed polarity condition, as described above, activates the maintenance termination unit 22. Once the maintenance termination unit 22 isolates the customer's premise wiring 14 from the local loop, polarity may again be switched. The ring wire 18 would return to a normally positive voltage compared to the tip wire 20. Even though the ring wire 18 now has a positive voltage, the means of storing a charge helps maintain the isolation between the customer's premise wiring 14 and the local loop. The means of storing a charge acts to create a voltage differential between the first terminal 24 and the second terminal 26. The means of storing a charge may additionally, or alternatively, act to create a voltage differential between the third terminal 28 and the fourth terminal 30.

As FIG. 5 shows, the means of storing a charge may be a capacitor 38. The capacitor 38 is charged when polarity is initially reversed; that is, when polarity changes, thus moving the magnet 32 to isolate the customer's premises, the capacitor 38 charges while polarity is reversed. When polarity reverts to a conventional +48 volts on the ring wire 18, the capacitor 38, as FIG. 5 shows, maintains a voltage differential between the third terminal 28 and the fourth terminal 30. The capacitor 38 maintains a gathering of positive charges at the third terminal 28. These positive charges repel the positive charges gathered at the north pole 34 of the magnet 32. The capacitor 38 also maintains a gathering of negative charges at the fourth terminal 30, and these negative charges repel the negative charges gathered at the south pole 36. The capacitor 38, then, maintains the repelling force that causes the magnet 32 to move and to respectively disconnect terminals 24 and 26 from terminals 28 and 30.

The capacitor 38 maintains this isolation for a predefined length of time. The capacitance C of the capacitor 38 can be chosen to maintain a voltage for any amount of time, from milliseconds to hours, according to the well-known equation $$v(t) = \frac{1}{C} \int_0^t i(x)\,dx.$$

The capacitor 38, however, preferably only maintains a voltage for a predefined, finite amount of time, during which time the remote test is performed. The capacitor 38, for example, preferably maintains a voltage (charge) for an amount of time not exceeding about a minute. This "test window" should be ample time for a remote test of the local loop. When the test window expires, the maintenance termination unit 22 restores a connection between the local loop and the customer's premise wiring 14.

The maintenance termination unit 22 may also utilize an alternating current signal. Although the ring wire 18 usually carries a constant, DC voltage of +48 volts, the quick reversal in polarity creates a time-varying current that allows the capacitor 38 to charge. The reversal in polarity, however, could be accompanied by an alternating current (AC) burst signal. This AC burst signal would be sent along the local loop to the maintenance termination unit 22. Because the AC burst signal is time-varying, and biased by the reversed 48 volts, the AC burst signal ensures the capacitor 38 is charged. The AC burst signal could precede, or follow, the reversal of polarity. The duration of the AC burst signal, and its peak-to-peak magnitude, are chosen to ensure the capacitor 38 is adequately charged. Once the capacitor 38 is charged, by the reversal of polarity and/or by the AC burst signal, the local loop is remotely tested. Because the customer's premise wiring 14 is isolated from the local loop, if trouble is detected, that trouble lies within the local loop.

Figure 6:
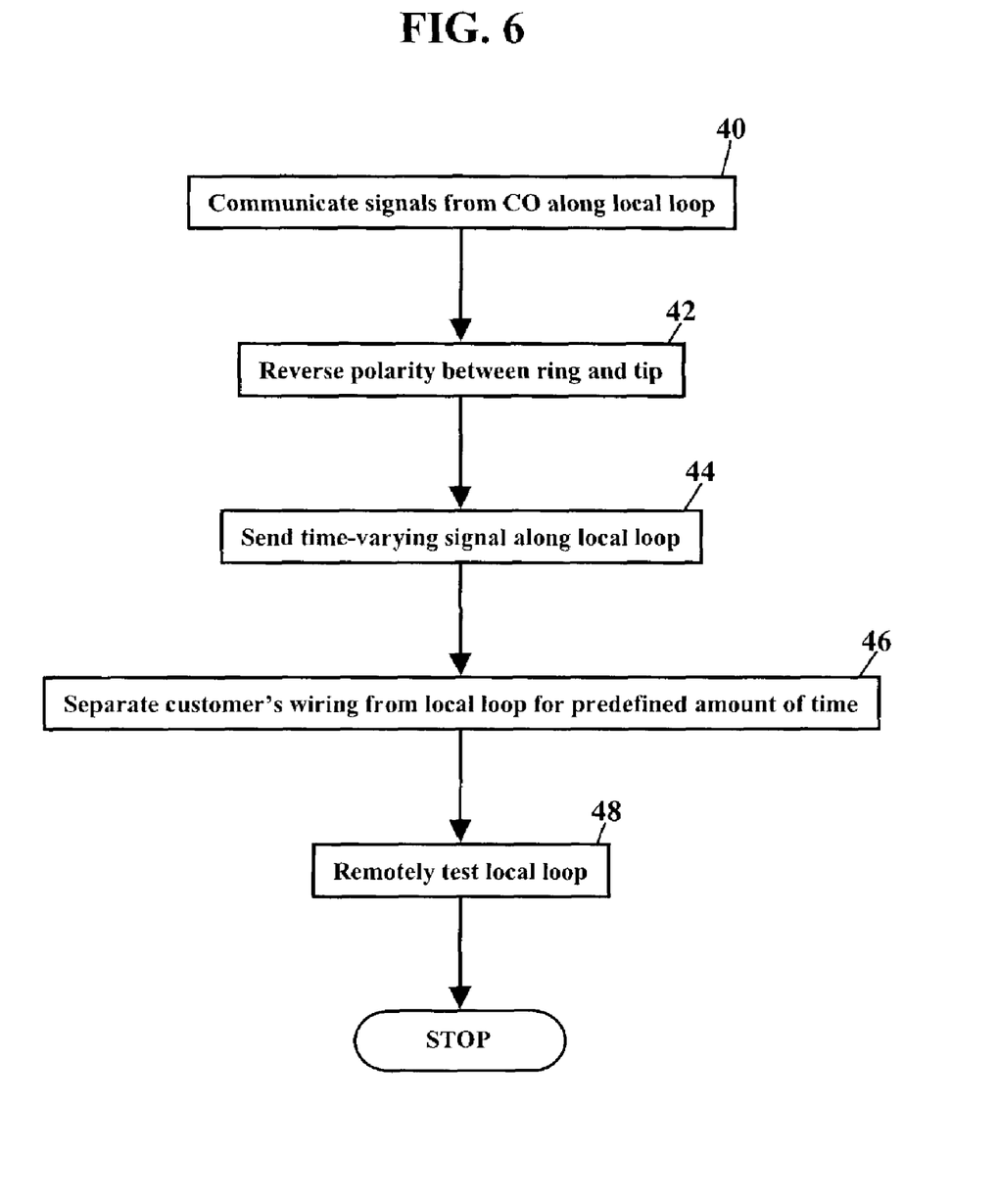
FIG. 6 is a flowchart showing one method of remotely testing a local loop for trouble.

FIG. 6 is a flowchart showing one method of remotely testing a local loop for trouble. Signals are communicated from a central office along a local loop (Block 40). The local loop comprises a ring wire and a tip wire. Polarity is reversed between the ring wire and the tip wire (Block 42). A time-varying signal is sent along the local loop (Block 44). A customer's wiring is isolated from the local loop for a predefined amount of time (Block 46), and a test of the local loop is remotely performed (Block 48) while the customer's wiring is separated.

Figure 7:
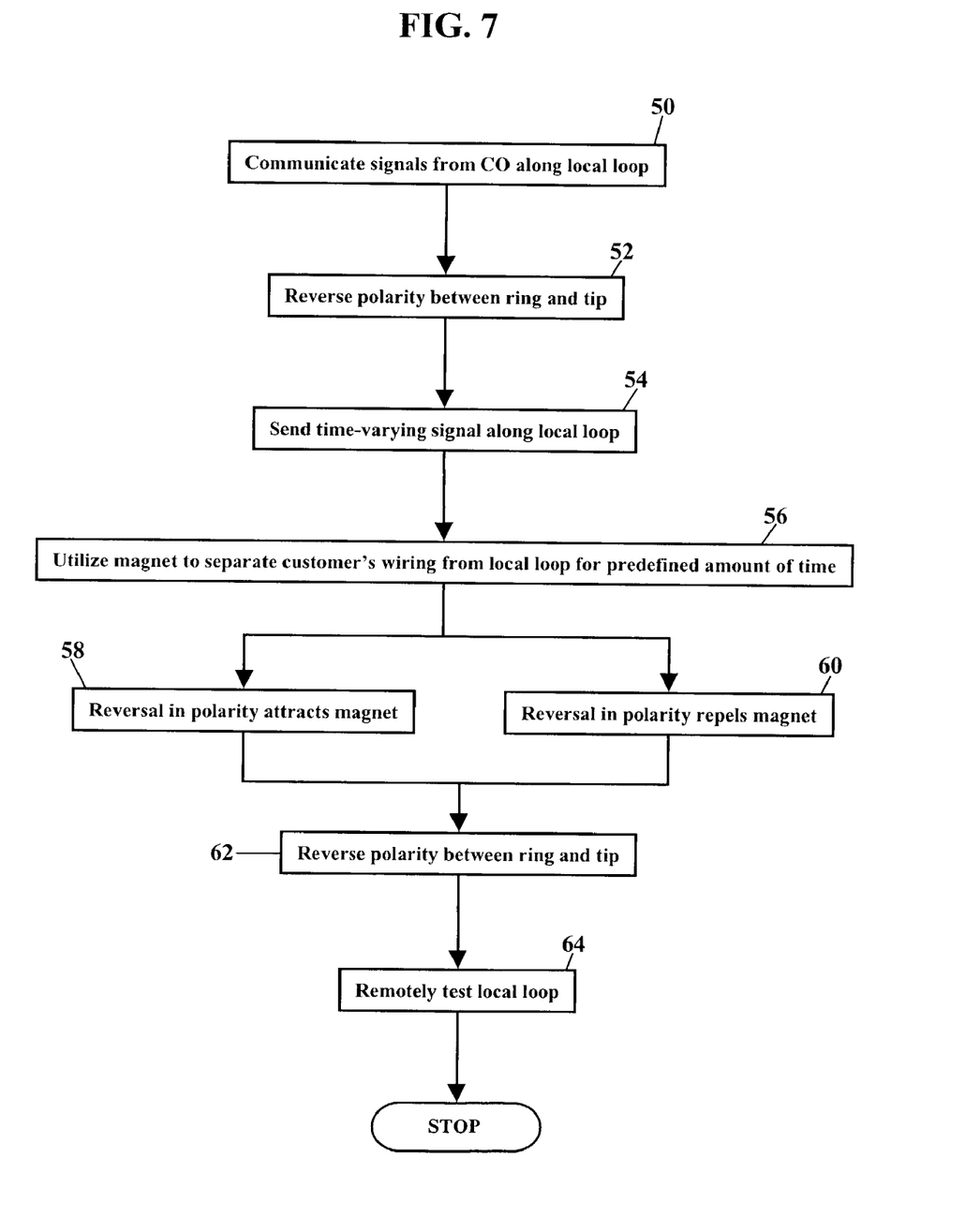
FIG. 7 is a flowchart showing another method of remotely testing a local loop for trouble.

FIG. 7 is a flowchart showing another method of remotely testing a local loop for trouble. Signals are communicated from a central office along a local loop (Block 50). The local loop comprises a ring wire and a tip wire. Polarity is reversed between the ring wire and the tip wire (Block 52). A time-varying AC signal is sent along the local loop (Block 54). A magnet is utilized to isolate a customer's wiring from the local loop for a predefined amount of time (Block 56). The reversal in polarity may attract the magnet (Block 58) or repel the magnet (Block 60). Polarity may be again reversed (Block 62), returning the ring wire to a positive voltage compared with the tip wire. A test of the local loop is then remotely performed (Block 64) while the customer's wiring is separated. While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
   communicating signals from a central office along a local loop, the local loop comprising a ring wire and a tip wire;
   reversing polarity between the ring wire and the tip wire;
   in response to the reversed polarity, moving a magnet to isolate a customer's wiring from the local loop; and
   remotely performing a test of the local loop,
   wherein the reversed polarity causes the customer's wiring to be isolated from the local loop, and the local loop may be remotely tested for trouble.

2. A method according to claim 1, wherein the step of moving the magnet to isolate the customer's wiring comprises attracting the magnet.

3. A method according to claim 1, wherein the step of moving the magnet to isolate the customer's wiring comprises repelling the magnet.

4. A method according to claim 1, further comprising sending a time-varying AC signal along the local loop.

5. A method according to claim 1, wherein the step of remotely performing the test of the local loop comprises performing the test while the customer's wiring is isolated from the local loop.

6. A method according to claim 1, further comprising using capacitance to maintain a voltage differential between poles of the magnet.

7. A method according to claim 1, wherein the step of moving the magnet is maintained for a predefined amount of time.

8. A maintenance termination unit according to claim 1, further comprising a capacitor connected between poles of the magnet.

9. A maintenance termination unit in a telecommunications network, comprising:
- terminals for connecting the maintenance termination unit to a ring wire and to a tip wire of a local loop;
- a magnet moving in response to a change in polarity between the ring wire and the tip wire, and
- a capacitor connected to and between poles of the magnet, wherein the maintenance termination unit isolates a customer's wiring from the local loop, thus allowing a remote test to determine whether trouble exists in the local loop.

10. A maintenance termination unit according to claim 9, further comprising additional terminals for connecting the maintenance termination unit to a subscriber's premises.

11. A maintenance termination unit according to claim 9, further comprising means of storing a charge to create a voltage differential between the terminals.

12. A maintenance termination unit according to claim 9, wherein the magnet moves by attraction to isolate the customer's wiring.

13. A maintenance termination unit according to claim 9, wherein the magnet is repelled to isolate the customer's wiring.

14. A maintenance termination unit according to claim 9, wherein the magnet moves via a time-varying AC signal along the local loop.

* * * * *